United States Patent
Jones, Jr. et al.

(10) Patent No.: US 10,450,470 B2
(45) Date of Patent: Oct. 22, 2019

(54) POLYURETHANE ELASTOMERIC COMPOSITION AND METHOD OF PREPARING THE SAME

(71) Applicant: BASF SE, Ludwigshafen (DE)

(72) Inventors: Charles E. Jones, Jr., Detroit, MI (US); Karl R. Gust, Clawson, MI (US)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 15/038,763

(22) PCT Filed: Nov. 25, 2014

(86) PCT No.: PCT/US2014/067309
§ 371 (c)(1),
(2) Date: May 24, 2016

(87) PCT Pub. No.: WO2015/081068
PCT Pub. Date: Jun. 4, 2015

(65) Prior Publication Data
US 2017/0158875 A1    Jun. 8, 2017

Related U.S. Application Data

(60) Provisional application No. 61/909,110, filed on Nov. 26, 2013.

(51) Int. Cl.
*C09D 5/16* (2006.01)
*C09D 175/14* (2006.01)
(Continued)

(52) U.S. Cl.
CPC ............ *C09D 5/1662* (2013.01); *B05D 1/02* (2013.01); *B05D 1/18* (2013.01); *C08G 18/4825* (2013.01);
(Continued)

(58) Field of Classification Search
CPC ............ C08G 18/4825; C08G 18/6588; C08G 18/6674; C08G 18/69; C08G 18/698;
(Continued)

(56) References Cited

U.S. PATENT DOCUMENTS

| 3,674,743 A | 7/1972 | Verdol et al. |
| 4,285,854 A * | 8/1981 | Kageyama ............ B29D 30/04 524/789 |

(Continued)

FOREIGN PATENT DOCUMENTS

| CN | 1092783 A | 9/1994 |
| CN | 101842442 A | 9/2010 |

(Continued)

OTHER PUBLICATIONS

International Search Report for Application No. PCT/US2017/013395 dated Apr. 21, 2017, 4 pages.
(Continued)

*Primary Examiner* — Thao T Tran
(74) *Attorney, Agent, or Firm* — DLA Piper LLP (US)

(57) ABSTRACT

A polyurethane elastomeric composition includes the reaction product of an isocyanate component and an isocyanate-reactive component. The isocyanate-reactive component includes a polydiene polyol present in the isocyanate-reactive component in an amount of greater than 0 and less than about 95 parts by weight based on 100 parts by weight of the isocyanate-reactive component. The polydiene polyol has an average hydroxy functionality of no greater than about 3 and a number average molecular weight of from about 1000 to less than about 2000 g/mol.

18 Claims, 4 Drawing Sheets

(51) Int. Cl.
*B05D 1/02* (2006.01)
*B05D 1/18* (2006.01)
*C08G 18/65* (2006.01)
*C08G 18/66* (2006.01)
*C08G 18/69* (2006.01)
*C08G 18/76* (2006.01)
*C08G 18/48* (2006.01)

(52) U.S. Cl.
CPC ..... *C08G 18/6588* (2013.01); *C08G 18/6674* (2013.01); *C08G 18/69* (2013.01); *C08G 18/698* (2013.01); *C08G 18/7664* (2013.01); *C09D 175/14* (2013.01)

(58) Field of Classification Search
CPC .............. C08G 18/7664; C09D 175/14; C09D 5/1662; B05D 1/02; B05D 1/18; Y10T 428/31609
USPC ............ 528/65; 428/425.8, 425.9; 427/427.5
See application file for complete search history.

(56) References Cited

U.S. PATENT DOCUMENTS

| | | | |
|---|---|---|---|
| 4,659,779 A | | 4/1987 | Bagga et al. |
| 4,933,373 A | * | 6/1990 | Moren ............... C08G 18/6576 521/170 |
| 5,690,780 A | | 11/1997 | Zharov et al. |
| 5,990,036 A | | 11/1999 | Deviny |
| 2004/0026653 A1 | | 2/2004 | Bonnet et al. |
| 2004/0048015 A1 | | 3/2004 | Berger |
| 2008/0045643 A1 | * | 2/2008 | Henning ................ B60C 1/00 524/493 |
| 2009/0082518 A1 | * | 3/2009 | Uchida .............. C08G 18/0823 524/539 |
| 2011/0098417 A1 | * | 4/2011 | Worley ................. C08G 18/10 525/328.8 |
| 2013/0243480 A1 | * | 9/2013 | Sakurai .................. G03G 15/08 399/111 |
| 2014/0083604 A1 | | 3/2014 | Gautriaud et al. |
| 2016/0090515 A1 | * | 3/2016 | Roock ................ C08G 18/4829 428/423.1 |
| 2016/0376496 A1 | * | 12/2016 | Gershanovich .......... C09K 8/66 507/219 |

FOREIGN PATENT DOCUMENTS

| | | |
|---|---|---|
| CN | 102399348 A | 4/2012 |
| CN | 103013425 A | 4/2013 |
| EP | 2 743 284 A1 | 6/2014 |
| WO | WO 97/07171 A1 | 2/1997 |
| WO | WO 2009/027686 A1 | 3/2009 |
| WO | WO 2012/030339 A1 | 3/2012 |
| WO | WO 2014/028444 A2 | 2/2014 |
| WO | WO 2015/081068 A1 | 6/2015 |

OTHER PUBLICATIONS

English language abstract and machine-assisted English translation for EP 2 743 284 extracted from espacenet.com database on Apr. 27, 2017, 24 pages.
International Search Report for Application No. PCT/US2014/067309 dated Feb. 26, 2015, 3 pages.
QVC Thermoset Specialties, "Safety Data Sheet: Hypro 1200X90 HTB", Jan. 24, 2012, 8 pages.
CVC Thermoset Specialties, "Technical Bulletin: Hypro 1200X90 HTB", Jun. 22, 2012, 2 pages.
Frisch et al., "Polyurethane Elastomers Based Upon Novel Hydrocarbon-Based Diols", Paper 42, Mar. 1996, pp. 1 -11.
Gajewski, "Chemical Degradation of Polyurethene", Uniroyal Chemical Co., Rubber World, Sep. 1990, pp. 15-18.
Sartomer, Product Bulletin: Hydroxl-Terminated Polybutadiene Resins and Derivatives—Poly bd and Krasol, Jun. 2007, pp. 1-42.
First Office Action from corresponding Chinese Patent Application No. 20180073999.0 dated Apr. 23, 2018, and its English translation.

* cited by examiner

POLYURETHANE ELASTOMERIC COMPOSITION AND METHOD OF PREPARING THE SAME

CROSS-REFERENCE TO RELATED APPLICATIONS

This application is the National Stage of International Patent Application No. PCT/US2014/067309, filed on Nov. 25, 2014, which claims priority to and all the advantages of U.S. Provisional Patent Application No. 61/909,110, filed on Nov. 26, 2013, the content of which is incorporated herein by reference.

FIELD OF THE INVENTION

The present invention generally relates to a polyurethane elastomeric composition and a method of preparing the polyurethane elastomeric composition. More particularly, the polyurethane elastomeric composition includes an isocyanate component and an isocyanate-reactive component including a polydiene polyol. The polyurethane elastomeric composition may be used in subsea applications, and may particularly be used in a coating for subsea pipelines and other subsea structures.

BACKGROUND

Domestic energy needs currently outpace readily accessible energy resources, which has forced an increasing dependence on foreign petroleum fuels, such as oil and gas. At the same time, existing energy resources are significantly underutilized, in part due to inefficient oil and gas procurement methods.

Petroleum fuels, such as oil and gas, are typically procured from subsurface reservoirs via a wellbore that is drilled by a rig. In offshore oil and gas exploration endeavors, the subsurface reservoirs are beneath the ocean floor. To access the petroleum fuels, the rig drills into the ocean floor from typically between one to two miles beneath the ocean floor. Various subsea pipelines and structures are utilized to transport the petroleum fuels from this depth beneath the ocean floor to above the surface of the ocean and particularly, to an oil platform located on the surface of the ocean. These subsea pipelines and other structures may be made of an expandable material. For example, the expandable material may be a metallic material or a combination of metallic materials. The petroleum fuels, such as the oil and gas, at a depth from about one to two miles beneath the ocean floor are very hot (e.g., around 130° C.). In contrast, at this depth, the seawater is very cold (e.g., around 4° C.). This vast difference in average seawater temperature and average petroleum fuel temperature requires that the various subsea pipelines and structures used to transport the petroleum fuels from beneath the ocean floor to above the surface of the ocean be insulated. Insulation is required to maintain a relatively high temperature of the petroleum fuels such that the fuels, such as oil and gas, can easily flow through the subsea pipelines and other subsea structures. Generally, if the fuel, such as oil, becomes too cold due to the temperature of the seawater (i.e., without insulation), it will become too viscous to flow through the pipelines and other structures to be able to reach the ocean surface and/or oil platform. Even in instances where the fuel may be able to flow, it may be flowing too slowly to reach the ocean surface and/or the oil platform in an efficient amount of time for the desired operating conditions. Alternatively and/or additionally, the oil may form waxes that detrimentally act to clog the pipelines and structures. Yet further, due to the cold temperature of the seawater, the oil may form hydrates that detrimentally change the nature of the oil and may also act to clog the pipelines and structures. In addition, the various subsea pipelines and structures may be manipulated in different ways. For instance, pipelines are dropped off the edge of the oil platform, rig or ship, and maneuvered, usually by machine, through the ocean and into the ocean floor. Because of the manipulations and maneuvers, the insulation that coats the exterior of the pipelines and other structures must be flexible. Flexible elastomers are therefore used as exterior coatings on the pipelines and other structures to insulate the pipelines and other structures.

However, many existing elastomers exhibit inadequate thermal stability and inadequate insulation properties at high and varying temperature and pressure applications typical for offshore oil and gas exploration endeavors. For example, the elastomer-coated pipelines may be as long as 50 miles and may be both above water and below water. Such a distance through the depth of the ocean, and miles below the ocean floor, exhibits many temperature and pressure changes. To complicate these instances, oil must also travel, in the pipelines, 50 miles through these temperature and pressure changes and from one to two miles beneath the ocean floor to the oil platform above the ocean surface, without losing its integrity. For example, the oil may need to have a low viscosity to remain flowable during these distances and may need to be adequately uniform, e.g., without detrimental hydrates and waxes. Further, many existing elastomers degrade when exposed to these temperature and pressure changes below and above the ocean surface.

One form of degradation for existing elastomers, such as elastomers comprising polyurethane, is that due to inadequate hydrolytic stability of these elastomers. Existing polyurethane elastomers do not exhibit adequate hydrolytic stability and tend to decompose or breakdown when exposed to water, including seawater. Existing polyurethane elastomers, that form the exterior coatings on the subsea pipelines and other structures, chemically react with seawater and degrade. Particularly, the urethane bonds in the polyurethane are highly susceptible to hydrolysis, especially at high temperatures and/or high pressures. The polyurethane will degrade to form carbamic acids and alcohols. The high temperature may be due to the temperature of the oil as it is being extracted from beneath the ocean floor.

Finally, many existing elastomers are coated onto pipelines and other structures via noneconomical coating processes and therefore contribute to increased production costs.

Due to the inadequacies of existing elastomers, there remains an opportunity to provide an improved elastomer.

SUMMARY OF THE INVENTION

The present invention provides a polyurethane elastomeric composition. The polyurethane elastomeric composition includes the reaction product of an isocyanate component and an isocyanate-reactive component. The isocyanate-reactive component includes a polydiene polyol present in the isocyanate-reactive component in an amount of greater than 0 and less than about 95 parts by weight based on 100 parts by weight of the isocyanate-reactive component. The polydiene polyol has an average hydroxy functionality of no greater than about 3 and a number average molecular weight of from about 1000 to less than about 2000 g/mol.

The present invention also provides a method of forming the polyurethane composition. The method includes providing an isocyanate component, providing an isocyanate-reactive component including a polydiene polyol present in the isocyanate-reactive component in an amount of greater than 0 and less than about 95 parts by weight based on 100 parts by weight of the isocyanate-reactive component and having an average hydroxy functionality of no greater than about 3 and a number average molecular weight of from about 1000 to less than about 2000 g/mol; and reacting the isocyanate component and the isocyanate-reactive component together, thereby forming the polyurethane elastomeric composition.

The polyurethane elastomeric composition of the present invention may be hydrolytically stable, even at high temperatures, due to the polydiene polyol. As such, the polyurethane coating of the present invention exhibits hydrolytic and thermal stability as well as insulation properties when used in offshore oil and gas exploration endeavors.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
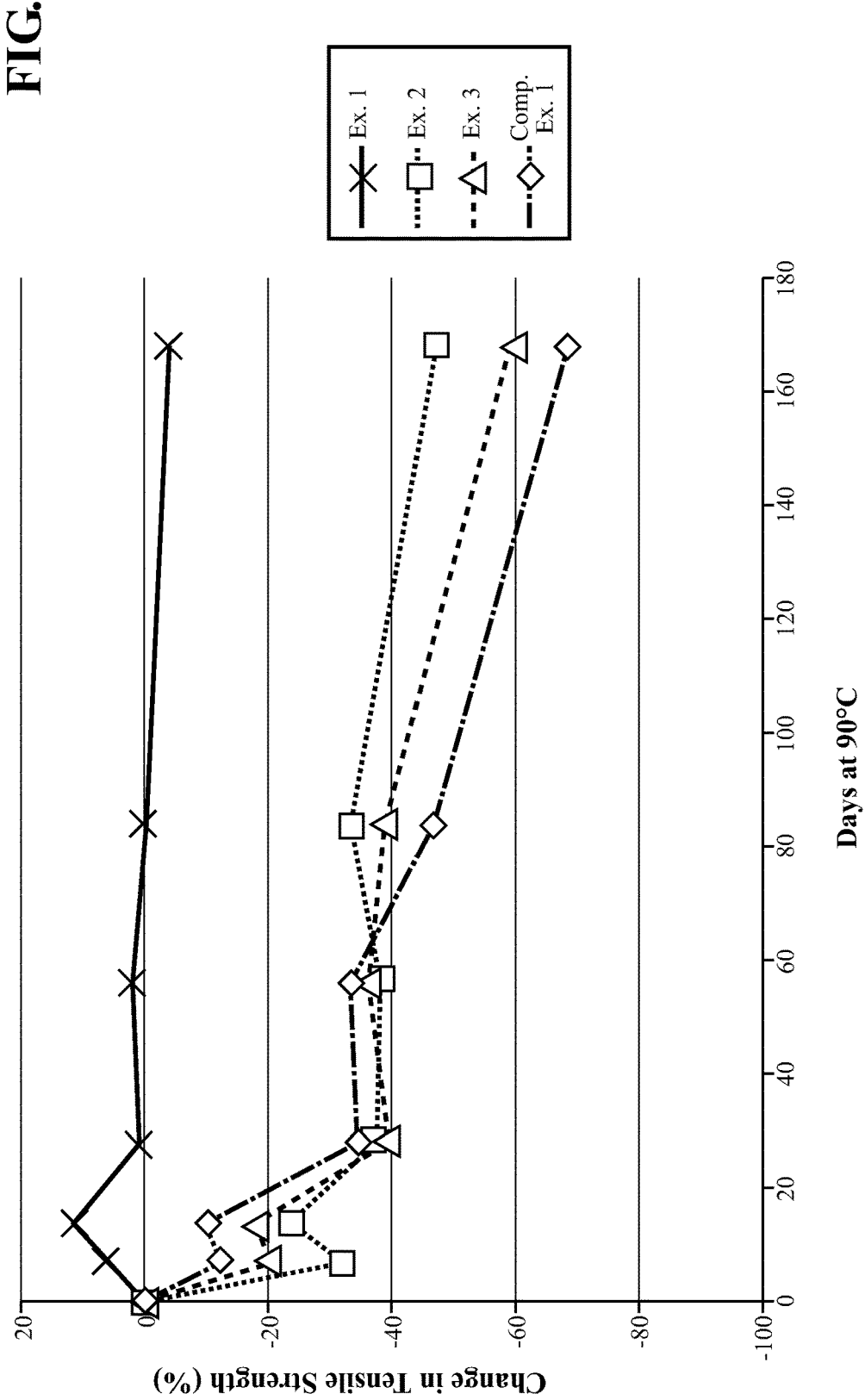
FIG. 1 is a graph showing the change in tensile strength of Examples 1-3 and Comparative Example 1 at 90° C. over a period of 168 days.

The present invention includes a polyurethane elastomeric composition, a method of forming the polyurethane elastomeric composition, a subsea structure at least partially coated with the polyurethane elastomeric composition and a method of insulating the subsea structure from a fluid. The polyurethane elastomeric composition is applied to a structure intended for subsea applications. For example, the polyurethane elastomeric composition may be applied to the exterior of the subsea structure. The polyurethane elastomeric composition may partially coat the subsea structure. The composition may alternatively fully coat the subsea structure. The subsea structure may be a pipe. Alternatively, the subsea structure may be any type of structure used in offshore oil and gas exploration. Suitable subsea structures for purposes of the present invention include any known structures for use during offshore oil and gas exploration endeavors. Non-limiting examples of suitable subsea structures include pipes, flowlines, pipelines, manifolds, pipeline end terminators, pipeline end manifolds, risers, field joints, other joints, jumpers, pipe pigs, bend restrictors, bend stiffeners or Christmas trees. A Christmas tree is a type of structure well known in the offshore oil and gas exploration field. It is to be appreciated that other structures not described herein may also be suitable for the purposes of the present invention. The subsea structure may be a pipe having a diameter of about 12 to about 18 inch diameter. The diameter of a subsea pipe structure is not limited, and may range from a few inches, in the case of a flowline, to several feet.

The polyurethane elastomeric composition forms a coating that insulates the subsea structure. For example, the polyurethane elastomeric composition may form an exterior partial or full coating having a thickness on the structure intended for subsea applications. The thickness of the coating may be half an inch thick. Alternatively, the thickness of the coating may be one foot thick. In one embodiment, the thickness of the polyurethane elastomeric composition coating may be about four inches. In another embodiment, the thickness of the polyurethane elastomeric composition coating may be about six inches. In yet another embodiment, the thickness of the polyurethane elastomeric composition coating may be about nine inches.

In addition, the polyurethane elastomeric composition coating insulates the petroleum fuels, such as the oil and/or gas, that flow through the coated subsea structure. The polyurethane elastomeric composition coating may coat a large enough surface area of a subsea structure so that the coating can effectively insulate the subsea structure and the petroleum fuels, such as oil, flowing within the subsea structure. When the petroleum fuel, such as oil, is collected from about one to two miles beneath the ocean floor, the oil is very hot (e.g., around 130° C.). Seawater at this depth is very cold (e.g., around 4° C.). The polyurethane elastomeric composition coating insulates the oil during transportation from beneath the ocean floor to above the surface of the ocean. The polyurethane elastomeric composition coating insulates the oil so that the vast difference in average seawater temperature and average oil temperature does not substantially affect the integrity of the oil. The polyurethane elastomeric composition coating maintains a relatively high temperature of the petroleum fuels such that the fuels, such as oil, can easily flow through the subsea structures, such as pipes and pipelines. The polyurethane elastomeric composition coating adequately prevents the fuel (oil) from becoming too cold, and therefore too viscous to flow, due to the temperature of the seawater. The polyurethane elastomeric composition coating also adequately prevents the oil from forming waxes that detrimentally act to clog the subsea structures and/or from forming hydrates that detrimentally change the nature of the oil and also act to clog the subsea structures. The polyurethane elastomeric composition is flexible. The flexibility of the polyurethane elastomeric composition enables the subsea structures to be manipulated in different ways. For instance, the polyurethane elastomeric composition coated subsea structures, such as pipelines, may be dropped off the edge of an oil platform, rig or ship, and maneuvered, by machine or otherwise, through the ocean and into the ocean floor. Also, if any one of the subsea structures is made of an expandable material, such as a metallic material, it may expand due to any one of several factors, including heat. The flexibility of the polyurethane elastomeric composition allows for the expansion, due to, for instance, heat, without becoming delaminated itself. That is, the polyurethane elastomeric composition stretches with the expanding subsea structure without deteriorating or delaminating itself. It is to be appreciated that the polyurethane elastomeric composition of the present invention can also have applications beyond offshore oil and gas exploration, including, but not limited to, any type of underwater, including fresh water and seawater, applications.

The polyurethane elastomeric composition includes the reaction product of an isocyanate component and an isocyanate-reactive component.

The polyurethane elastomeric composition may be provided in a system including the isocyanate component and the isocyanate-reactive component. The system may be provided in two or more discrete components, such as the isocyanate component and the isocyanate-reactive (or resin) component, i.e., as a two-component (or 2K) system, which is described further below. It is to be appreciated that reference to the isocyanate component and the isocyanate-reactive component, as used herein, is merely for purposes of establishing a point of reference for placement of the individual components of the system, and for establishing a parts by weight basis. As such, it should not be construed as limiting the present invention to only a 2K system. For example, the individual components of the system can all be kept distinct from each other.

The polyurethane elastomeric composition includes the reaction product of the isocyanate component and the isocyanate-reactive component. The isocyanate component may include aliphatic isocyanates, aromatic isocyanates, polymeric isocyanates, or combinations thereof. The isocyanate component may include more than one different isocyanate, e.g., polymeric diphenylmethane diisocyanate and 4,4'-diphenylmethane diisocyanate. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate component may be an isocyanate pre-polymer. The isocyanate pre-polymer may be a reaction product of an isocyanate and a polyol and/or a polyamine. The isocyanate used in the pre-polymer can be any isocyanate as described above. The polyol used to form the pre-polymer may be selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the pre-polymer may be selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be included in the isocyanate component and may be used to prepare the polyurethane elastomeric composition include, but are not limited to, toluene diisocyanate; 4,4'-diphenylmethane diisocyanate; m-phenylene diisocyanate; 1,5-naphthalene diisocyanate; 4-chloro-1,3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable polyurethane elastomeric compositions can also be prepared from aromatic diisocyanates or isocyanates having one or two aryl, alkyl, arakyl or alkoxy substituents wherein at least one of these substituents has at least two carbon atoms.

The isocyanate component typically has an NCO content of from 20 to 45, alternatively from 25 to 35, weight percent when tested in accordance with DIN EN ISO 11909, and a viscosity at 25° C. of from 5 to 800, alternatively from 10 to 400, alternatively from 15 to 250, alternatively from 180 to 220, mPa·sec when tested in accordance with DIN EN ISO 3219.

Suitable isocyanates for the isocyanate component are commercially available from BASF Corporation of Florham Park, N.J. under the trade name LUPRANATE®.

In various embodiments the isocyanate component comprises monomeric and polymeric isocyanate. For example, in one embodiment the isocyanate component comprises polymeric diphenylmethane diisocyanate and 4,4'-diphenylmethane diisocyanate, and has an NCO content of about 33.5 weight percent. Alternatively, in another embodiment, the isocyanate component comprises polymeric diphenylmethane diisocyanate and 4,4'-diphenylmethane diisocyanate, and has an NCO content of about 31.3 weight percent.

The isocyanate component is typically reacted to form the polyurethane elastomeric composition in an amount of from 10 to 90, alternatively from 20 to 75, alternatively from 30 to 60, percent by weight based on the total weight of all components used to form the polyurethane elastomeric composition. The amount of the isocyanate component reacted to form the polyurethane elastomeric composition may vary outside of the ranges above, but is typically both whole and fractional values within these ranges. Further, it is to be appreciated that more than one isocyanate may be included in the isocyanate component, in which case the total amount of all isocyanates included is within the above ranges.

The isocyanate-reactive component comprises a polydiene polyol, which reacts with the isocyanate component. The isocyanate-reactive component may include additional polyols, i.e., one or more supplemental polyols. For purposes of the present invention, the term "polyol" is used to describe a molecule that includes one or more hydroxyl functional groups, typically at least two hydroxyl functional groups and have a number average molecular weight of greater than 400 g/mol.

The polydiene polyol comprises polymerized diene units. For purposes of the subject invention, the term "diene units" is used to describe units within a polymer which were formed from a diene or diolefin, i.e., a hydrocarbon having two carbon-carbon double bonds. Examples of dienes which can be used to from the polydiene include, but are not limited to, 1,2-propadiene, isoprene, and 1,3-butadiene.

In one embodiment, the polydiene polyol is a polybutadiene polyol, i.e., is formed from 1,3-butadiene and thus comprises butadiene units. Of course, 1,3-butadiene can polymerize to form 1,4-cis units, 1,4-trans units, and 1,2-vinyl units. The polybutadiene polyol may include, no less than 10, alternatively no less than 15, alternatively no less than 20, alternatively no less than 25, alternatively no less than 30, alternatively no less than 35, alternatively no less than 40, alternatively no less than 45, alternatively no less than 50, alternatively no less than 55, alternatively no less than 60, alternatively no less than 65, percent by weight 1,2-vinyl units based the total weight of the polybutadiene polyol. It is believed that the structure of the polybutadiene polyol imparts hydrolytic stability to the polyurethane elastomeric composition. It is also believed that the structure of the polybutadiene polyol imparts low moisture permeability and/or low temperature flexibility to the polyurethane elastomeric composition.

The polydiene polyol typically has an average hydroxy functionality no greater than about 3, alternatively from about 2 to about 3, alternatively about 2. The polybutadiene polyol may include an average hydroxy functionality of no greater than 3, alternatively no greater than 2.7, alternatively no greater than 2.6, alternatively no greater than 2.5, alternatively greater than 2.4, alternatively no greater than 2.3, alternatively no greater than 2.1, alternatively no greater than 1.9, alternatively no greater than 1.7. In one embodiment, the polydiene polyol is terminated with hydroxyl groups. In another embodiment, the polydiene polyol is terminated at both ends with hydroxyl groups. In another embodiment, the polydiene polyol is a hydroxy-terminated polybutadiene, i.e., is a liner polybutadiene having two primary hydroxy functional groups. In another embodiment, the hydroxy-terminated polybutadiene is terminated at each end with a hydroxy functional group.

The polydiene polyol typically has a lower molecular weight. Specifically, the polydiene polyol typically has a number average molecular weight of from about 1000 to less than about 3000, alternatively from about 1000 to less than about 2000, alternatively from 1100 to 1900, alternatively from 1200 to 1800, alternatively from 1300 to 1700, alternatively from 1400 to 1600, g/mol, and a viscosity at 30° C. of from 0.5 to 6.0, alternatively from 0.5 to 2.5, alternatively from 0.7 to 2.3, alternatively from 0.8 to 2.1, alternatively from 0.9 to 1.9, Pa·sec when tested in accordance with DIN EN ISO 3219, as modified for a viscosity measurement at 30° C.

Suitable polydiene polyols are commercially available from TOTAL of Houston, Tex. under the trade names Poly Bd® or Krasol®.

In a preferred embodiment, the polydiene polyol is a hydroxy-terminated polybutadiene having about 20 percent by weight 1,2-vinyl units, a molecular weight of about 1200 to 1350 g/mol, and a viscosity at 30° C. of about 0.9 to 1.9 Pa·sec. In another preferred embodiment, the polydiene polyol is a hydroxy-terminated polybutadiene having about 20 percent by weight 1,2-vinyl units, a molecular weight of about 1200 g/mol, and a viscosity at 30° C. of about 1.4 Pa·sec. In another preferred embodiment, the polydiene polyol is a hydroxy-terminated polybutadiene having about 20 percent by weight 1,2-vinyl units, a molecular weight of about 1350 g/mol, and a viscosity at 30° C. of about 1.4 Pa·sec. It is believed that because of the concentration of 1,2-vinyl units, i.e., olefinic double bonds, and low molecular weight, the hydroxy-terminated polybutadiene of this embodiment is a liquid at room temperature. The liquid is typically clear and water-white. The liquid form facilitates the formation of a consistent and uniform polyurethane elastomeric composition coating on the subsea structures. Further, the polybutadiene polyol imparts hydrolytic stability, low moisture permeability and/or low temperature flexibility to the polyurethane elastomeric composition. Alternatively, a polydiene polyol that is a hydroxy-terminated polybutadiene having about 20 percent by weight 1,2-vinyl units, a molecular weight of about 2800 g/mol, and a viscosity at 30° C. of about 5 Pa·sec may be used.

The polydiene polyol is typically present in the isocyanate-reactive component in an amount of from greater than 0 and less than 95 parts by weight based on 100 parts by weight of said isocyanate-reactive component, alternatively from 10 to 95, alternatively from 30 to 90, alternatively from 50 to 90, alternatively from 60 to 90, alternatively from 60 to 80, parts by weight based on 100 parts by weight of the isocyanate-reactive component. The amount of polydiene polyol may vary outside of the ranges above, but may be both whole and fractional values within these ranges. Further, it is to be appreciated that more than one polydiene polyol may be included in the isocyanate-reactive component, in which case the total amount of all polydiene polyol included is within the above ranges.

As alluded to above, in addition to the polydiene polyol, the isocyanate-reactive component may also include one or more supplemental polyols. If included, the supplemental polyol is typically selected from the group of conventional polyols which are not polydiene polyols, such as polyether polyols, polyester polyols, polyether/ester polyols, and combinations thereof. In one embodiment, the supplemental polyol has a water content below 0.05 percent by weight based on the total weight of the polyol. In additional embodiments, the supplemental polyol has a total sodium (Na) and potassium (K) contents less than about 15, alternatively less than about 10, alternatively less than about 5 ppm. In one embodiment, the isocyanate-reactive component may also comprise a polyether polyol having a higher average hydroxy functionality, e.g., greater than about 3. In another embodiment, the polyether polyol and the polydiene polyol together have an average hydroxy functionality of no greater than about 3, alternatively from about 2 to about 3, alternatively about 2. The polyether polyol and polybutadiene polyol together may include an average hydroxy functionality of no greater than 3, alternatively no greater than 2.7, alternatively no greater than 2.6, alternatively no greater than 2.5, alternatively greater than 2.4, alternatively no greater than 2.3, alternatively no greater than 2.1, alternatively no greater than 1.9, alternatively no greater than 1.7.

The supplemental polyol may be included in the isocyanate-reactive component in an amount of from 1 to 70, alternatively from 5 to 50, alternatively 5 to 25, percent by weight based on the total weight of all components included in the isocyanate-reactive component. The amount of supplemental polyol may vary outside of the ranges above, but may be both whole and fractional values within these ranges. Further, it is to be appreciated that more than one supplemental polyol may be included in the isocyanate-reactive component, in which case the total amount of all supplemental polyol included is within the above ranges. Particularly suitable supplemental polyols are commercially available from BASF Corporation of Wyandotte, Mich., under the trade name of Pluracol®. In a preferred embodiment, the supplemental polyol is a polyether polyol available from BASF Corporation of Wyandotte, Mich. under the trade name Pluracol® 2010.

In another embodiment, the supplemental polyol has a number average molecular weight of from about 400 to about 15,000, alternatively from about 450 to about 7,000, and alternatively from about 600 to about 5,000, g/mol. In another embodiment, the supplemental polyol has a hydroxyl number of from about 20 to about 1000, alternatively from about 30 to about 800, alternatively from about 40 to about 600, alternatively from about 50 to about 500, alternatively from about 55 to about 450, alternatively from about 60 to about 400, alternatively from about 65 to about 300, mg KOH/g. In yet another embodiment, the supplemental polyol has a nominal hydroxy functionality of from about 2 to about 4, alternatively from about 2.2 to about 3.7, and alternatively of from about 2.5 to about 3.5.

The isocyanate-reactive component may include one or more chain extenders. The chain extender has at least two hydroxyl functional groups and a number average molecular weight of no more than 400 g/mol. Specifically, the chain extender typically has a nominal functionality no greater than 4, alternatively no greater than 3, alternatively no greater than 2.5, alternatively from 1.9 to 3.1, alternatively from 1.9 to 2.5, and a number average molecular weight of from 50 to 400, alternatively from 60 to 300, alternatively from 62 to 220, alternatively from 70 to 220, alternatively from 75 to 195, alternatively about 192, alternatively about 134, alternatively about 76.

Non-limiting examples of such chain extenders include, but are not limited to, straight chain glycols having from 2 to 20 carbon atoms in the main chain, diols having an aromatic ring and having up to 20 carbon atoms, and even triols such as those set forth below. Examples of suitable chain extenders, for purposes of the present invention, include propylene glycol, dipropylene glycol, tripropylene glycol, diethylene glycol, 1,3-propanediol, 1,4-butanediol, 1,5-pentanediol, 1,6-hexanediol, 2-butene-1,4-diol, thoidiethanol, butyleneglycol, 1,4-bis (hydroxyethoxy) benzene, p-xylene glycol and hydrogenated products thereof, trimethylol, stearyl alcohol, N,N-diisopropanol aniline, 2-ethyl-1,3-hexanediol, 2-butyl-2-ethyl-1,3-propanediol, 2,2,4-trimethyl-1,3-pentanediol, and hydroxyethyl acrylate. In one embodiment, the chain extender may comprise an alkylene glycol. In one specific embodiment, the alkylene glycol is selected from the group of propylene glycol, dipropylene glycol, tripropylene glycol, and combinations thereof. In another embodiment, the chain extender is dipropylene glycol. It is believed that the chain extender imparts an even increased hydrolytic resistance, as well as increased strength, tear strength, and hardness to the polyurethane elastomeric composition as a result of its lower molecular weight and its molecular structure, e.g., ether groups.

In one embodiment, the isocyanate-reactive component consists essentially of the chain extender comprising an alkylene glycol and the polydienene polyol. In this and additional embodiments, the chain extender may present in the isocyanate-reactive component in an amount of more than about 5, alternatively more than about 10, alternatively more than about 15, alternatively more than about 20 parts by weight based on 100 parts by weight of all the components included in the isocyanate-reactive component. In other embodiments, the chain extender may present in the isocyanate-reactive component in an amount of less than about 30, alternatively less than about 25, alternatively less than about 20, parts by weight based on 100 parts by weight of all the components included in the isocyanate-reactive component. In another embodiment, the isocyanate-reactive component consists essentially of the chain extender comprising an alkylene glycol, the polydienene polyol, and a polyether supplemental polyol. The amount of chain extender may vary outside of the ranges above, but may be both whole and fractional values within these ranges. Further, it is to be appreciated that more than one chain extender may be included in the isocyanate-reactive component, in which case the total amount of all chain extender included is within the above ranges.

The isocyanate-reactive component also typically comprises one or more catalysts. The catalyst is typically present in the isocyanate-reactive component to catalyze the reaction between the isocyanate component and the isocyanate-reactive component. That is, isocyanate-reactive component typically includes a "polyurethane catalyst" which catalyzes the reaction between an isocyanate and a hydroxy functional group. It is to be appreciated that the catalyst is typically not consumed in the exothermic reaction between the isocyanate and the polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., tin, bismuth, lead, etc.

The isocyanate-reactive component can also include a "polycarbodiimide catalyst", i.e., a catalyst which catalyzes the reaction between two isocyanate functional groups. For example, the isocyanate-reactive component can include phospholene oxide catalyst. Suitable, non limiting examples of phospholene oxides include phospholene oxides such as 3-methyl-1-phenyl-2-phospholene oxide (MPPO), 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, 3-phospholene isomers thereof, and 3-methyl-1-ethyl-2-phospholene oxide (MEPO). Two particularly suitable phospholene oxides are MPPO and MEPO. The isocyanate-reactive component can also include a polyisocyanurate catalyst. For example, the isocyanate-reactive component can include potassium octoate.

The isocyanate-reactive component can also include a "curing agent", i.e., a crosslinker that crosslinks the carbon-carbon double bonds of the polydiene polyol. Examples of curing agents include, but are not limited to, organic peroxides, sulfur, and organic sulfur-containing compounds. Non-limiting examples of organic peroxides include dicumyl peroxide and t-butylperoxyisopropyl benzene. Non-limiting examples of organic sulfur-containing compounds include thiuram based vulcanization promoters such as tetramethylthiuram disulfide (TMTD), tetraethylthiuram disulfide (TETD), and dipentamethylenethiuram tetrasulfide (DPTT), 4,4'-dithiomorpholine.

The isocyanate-reactive component can also include an adhesion promoter. The adhesion promoter may be a silicon-containing adhesion promoter. Adhesion promoters are also commonly referred to in the art as coupling agents or binder agents. The adhesion promoter facilitates binding the polyurethane elastomeric coating composition to a subsea structure.

The isocyanate-reactive component can also include a wetting agent. The wetting agent may be a surfactant. The wetting agent may include any suitable wetting agent or mixtures of wetting agents known in the art. The wetting agent is employed to increase a surface area contact between the polyurethane elastomeric composition and the subsea structure.

The isocyanate-reactive component may also include various additional additives. Suitable additives include, but are not limited to, anti-foaming agents, processing additives, plasticizers, chain terminators, surface-active agents, flame retardants, anti-oxidants, water scavengers, fumed silicas, dyes or pigments, ultraviolet light stabilizers, fillers, thixotropic agents, silicones, amines, transition metals, and combinations thereof. The additive may be included in any amount as desired by those of skill in the art.

For example, a pigment additive allows the polyurethane elastomeric composition to be visually evaluated for thickness and integrity and can provide various marketing advantages.

The polyurethane elastomeric composition is formed from reacting the isocyanate component and the isocyanate-reactive component. Once formed, the polyurethane elastomeric composition is chemically and physically stable over a range of temperatures and does not typically decompose or degrade when exposed to higher pressures and temperatures, e.g., pressures and temperatures greater than pressures and temperatures typically found on the earth's surface. As one example, the polyurethane elastomeric composition is particularly applicable when the composition is used as a coating for a subsea structure and is exposed to cold seawater having a temperature of about 2 to 5° C., particularly about 4° C., and significant pressure and hot oil temperatures about 120 to 150° C., particularly about 130 to 140° C. The polyurethane elastomeric composition is generally viscous to solid nature, and depending on molecular weight.

The polyurethane elastomeric composition may be formed in-situ where the polyurethane elastomeric composition is disposed on the subsea structure during coating of the polyurethane elastomeric composition on the subsea structure. The components of the polyurethane elastomeric composition may be combined at the time of disposing the components onto the subsea structure.

The polyurethane elastomeric composition may exhibit excellent non-wettability in the presence of water, freshwater or seawater, as measured in accordance with standard contact angle measurement methods known in the art. The polyurethane coating may have a contact angle of greater than 90° and may be categorized as hydrophobic.

Further, the polyurethane elastomeric composition typically exhibits excellent hydrolytic resistance and will not lose strength and durability when exposed to water.

The polyurethane elastomeric composition can be cured/cross-linked prior to disposing the subsea structure into the ocean.

Multiple layers of the polyurethane elastomeric composition can be applied to the subsea structure. Each individual layer may have the same or different physical properties. In addition, the polyurethane elastomeric composition can be applied to the subsea structure in combination with coatings of different materials such as polyurethane coatings, polycarbodiimide coatings, polyamide imide coatings, polyisocyanurate coatings, polyoxizolidone coatings, polyacrylate coatings, epoxy coatings, furan coatings, sodium silicate coatings, polypropylene coatings, hybrid coatings, and other material coatings.

The polyurethane elastomeric composition of the present invention also exhibits excellent underwater thermal stability for high temperature and pressure applications. The polyurethane elastomeric composition may be stable at temperatures greater than 100, alternatively greater than 110, alternatively greater than 120, alternatively greater than 130, alternatively greater than 140, alternatively greater than 150, alternatively greater than 160, alternatively greater than 170, alternatively greater than 180, alternatively greater than 190, alternatively greater than 200° C. The thermal stability of the polyurethane elastomeric composition is typically determined by thermal gravimetric analysis (TGA).

Finally, the subsea structures may be coated with the polyurethane elastomeric composition via economical coating processes. Also, the subsea structure may typically not require multiple coating layers to minimize production costs.

As set forth above, polyurethane elastomeric composition is formed from providing the isocyanate component, providing the isocyanate-reactive component and reacting the isocyanate component and the isocyanate-reactive component. The method may further include heating the isocyanate component and the isocyanate-reactive component. The method of applying the polyurethane elastomeric composition to a subsea structure includes combining the isocyanate component and the isocyanate-reactive component to form a reaction mixture, and applying the subsea structure with the reaction mixture to form the polyurethane elastomeric composition coating disposed on the subsea structure. The method may include spraying the reaction mixture onto the subsea structure.

The isocyanate-reactive component is not required to be formed prior to exposure of the subsea structure to the individual components. That is, the isocyanate component and the isocyanate-reactive component may be combined to form the reaction mixture simultaneous with the coating of the subsea structure with the reaction mixture. Alternatively, as is indicated in certain embodiments below, the isocyanate component and the isocyanate-reactive component may be combined prior to the coating of the subsea structure. The steps of combining and coating are conducted, either sequentially or simultaneously at a temperature of from −10 to 50, alternatively from 0 to 35, ° C.

Various techniques can be used to apply the reaction mixture to the subsea structure. These techniques include molding the polyurethane elastomeric composition onto the subsea structure. Alternatively, these techniques include, but are not limited to spraying of the polyurethane elastomeric composition, or spraying the reaction mixture, on the subsea structure. The technique for applying the polyurethane elastomeric composition to the subsea structure is selected according to cost and production efficiencies.

The individual components of the polyurethane elastomeric composition may be contacted in a spray device to form a coating mixture. The spray device may include a hose and container compartments. The coating mixture may then be sprayed onto the subsea structure. The coating mixture may be the polyurethane elastomeric composition as fully reacted. That is, the coating mixture may be completely reacted before the mixture is sprayed onto the subsea structure. Alternatively, the coating mixture may be the reaction mixture, i.e., the components of the composition before they are reacted. In this case, the isocyanate component and the isocyanate-reactive component are separate immediately before they are contacted at a nozzle of the spray device. The components are then together sprayed onto the subsea structure. Spraying typically results in a uniform, complete, and defect-free polyurethane elastomeric composition coating on the subsea structure. For example, the coating is typically even and unbroken. The coating also typically has adequate thickness and acceptable integrity. Spraying also typically results in a thinner and more consistent coating on the subsea structure as compared to other techniques, and thus the subsea structure is coated economically. Spraying permits a continuous manufacturing process. Spray temperature is typically selected by one known in the art according to polyurethane coating technology and ambient humidity conditions. Further, one skilled in the art typically sprays the components of the polyurethane coating at a viscosity commensurate with the viscosity of the components.

The following examples are meant to illustrate the invention and are not to be viewed in any way as limiting to the scope of the invention.

EXAMPLES

Examples 1-6 are according to the present invention, which are formed with the components listed in Table 1 below. Comparative Examples 1 and 2 are also shown in Table 1 below. The amounts in Table 1 are in parts by weight, unless otherwise specified.

To form Examples 1-6 and Comparative Examples 1 and 2, the Polydiene Polyol (when present), Supplemental Polyol (when present) and the Chain Extender (when present) are pre-mixed to form an isocyanate-reactive component, which is then added to a speed mixer and mixed at 2300 rpm for 2 minutes. The isocyanate-reactive component is then degassed in a vacuum. The Isocyanate Component is separately degassed in a vacuum. Then, the isocyanate-reactive component and the Isocyanate Component are both poured into a speed mixer and mixed at 2300 rpm for 15 seconds to form a mixture.

Figure 2:
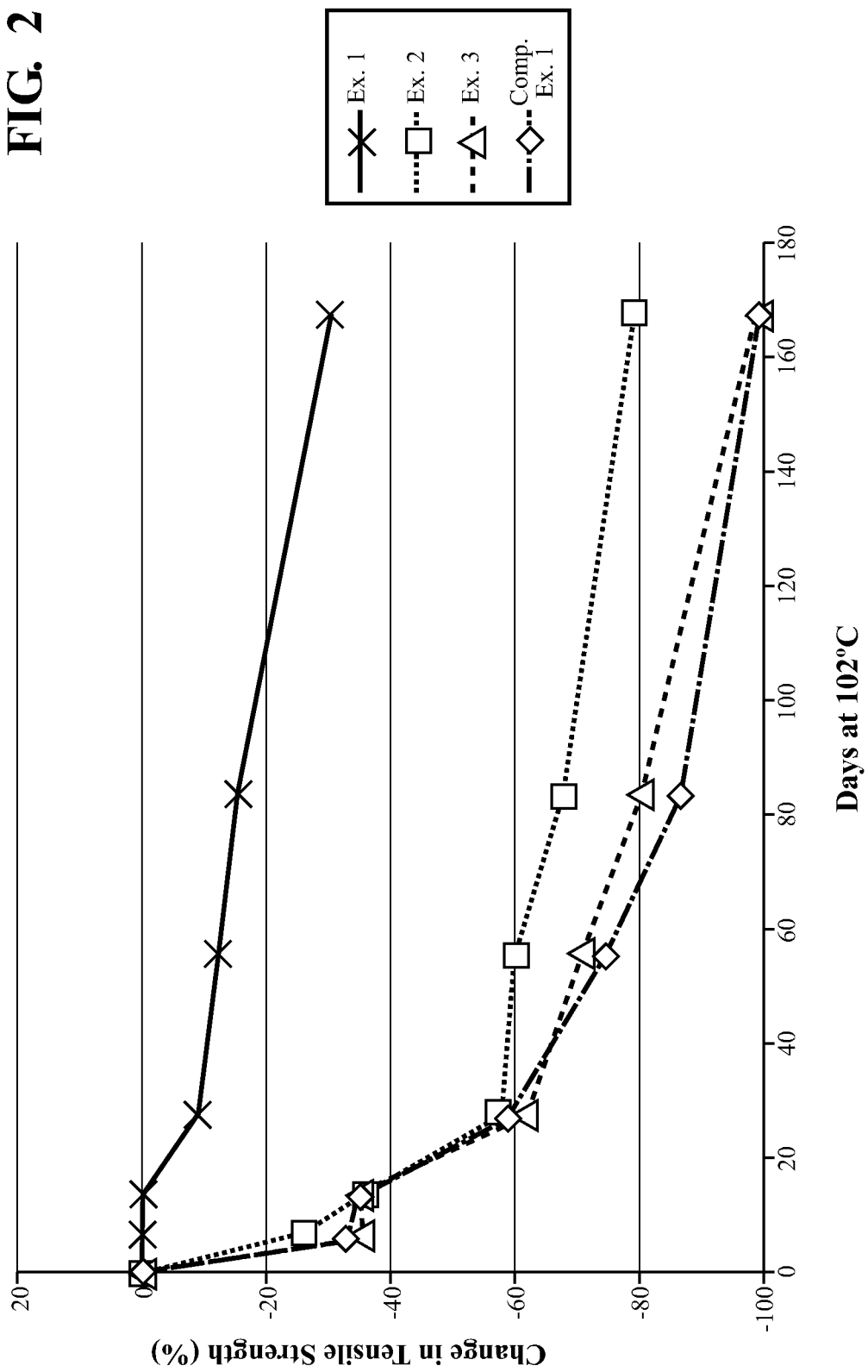
FIG. 2 is a graph showing the change in tensile strength of Examples 1-3 and Comparative Example 1 at 102° C. over a period of 168 days.
Figure 3:
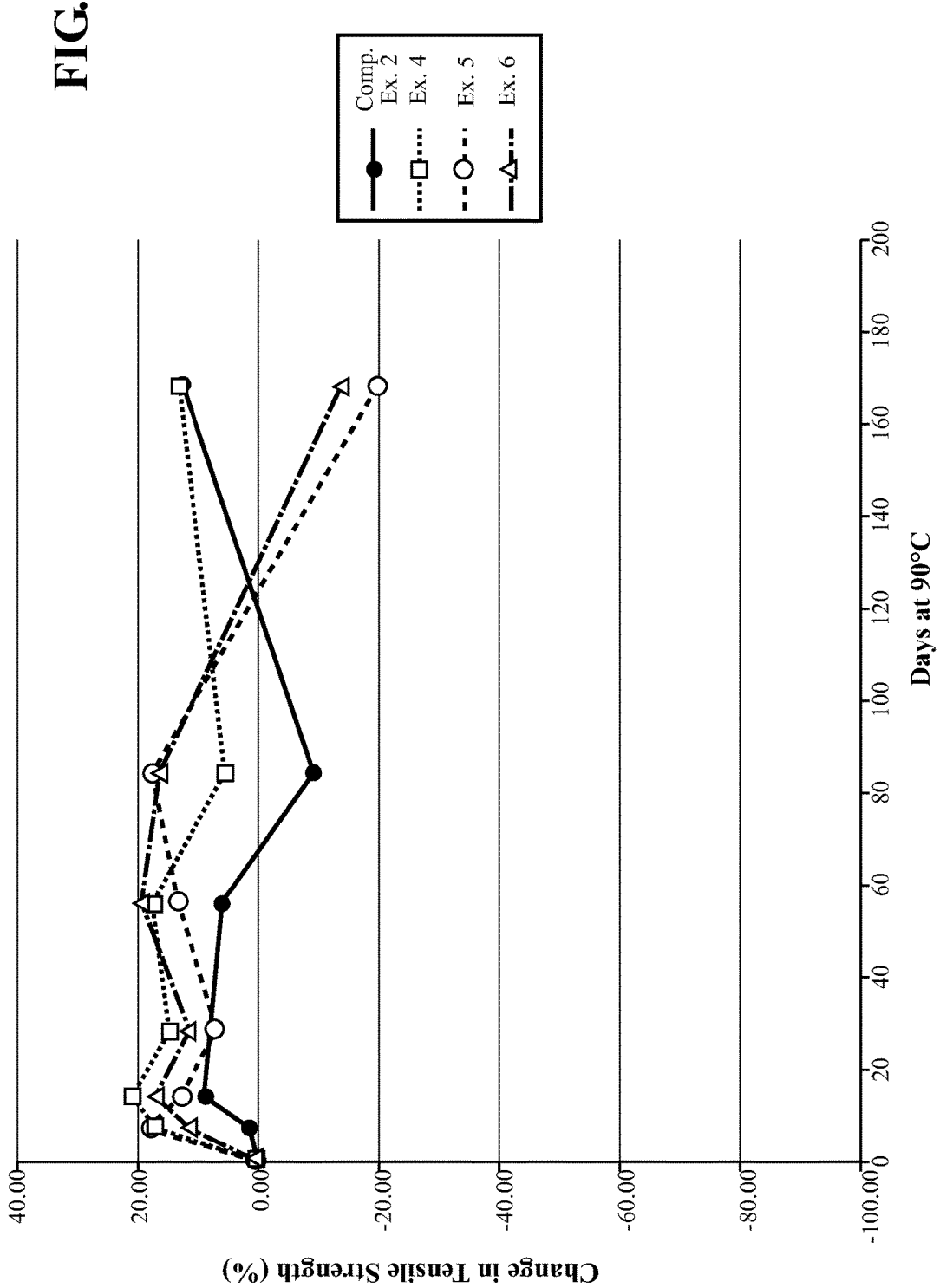
FIG. 3 is a graph showing the change in tensile strength of Examples 4-6 and Comparative Example 2 at 90° C. over a period of 168 days.
Figure 4:
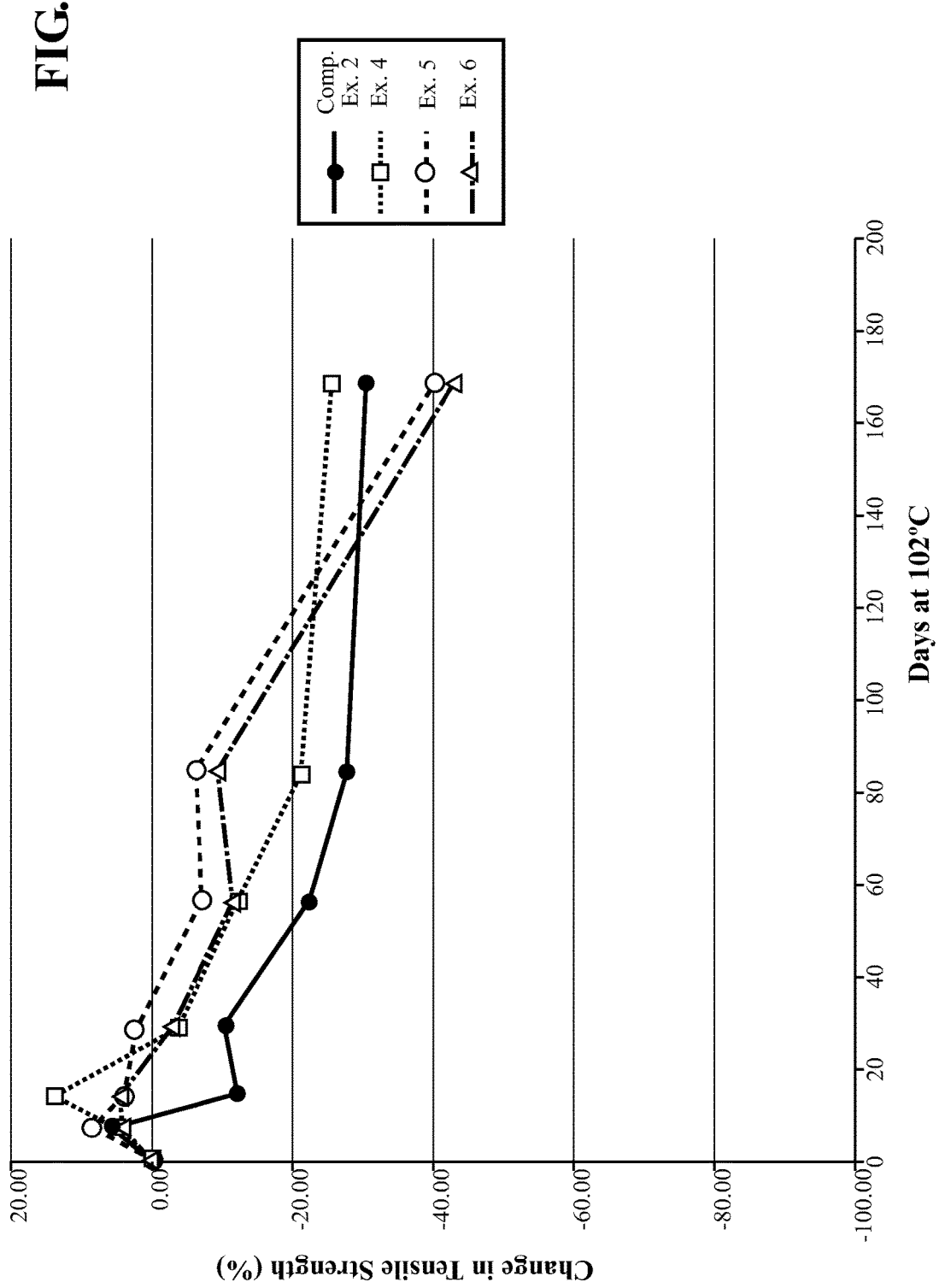
FIG. 4 is a graph showing the change in tensile strength of Examples 4-6 and Comparative Example 2 at 102° C. over a period of 168 days.

The mixture is poured into a pre-heated aluminum mold. The aluminum mold is pre-heated to a temperature of 80° C. The aluminum mold has a top and a bottom, is hinged on one side and is open on the opposing side. The aluminum mold is a book mold. The mixture remains in the book mold for 1 to 10 minutes, after which time the mixture gels. Then, the book mold with the gelled mixture is heated in an oven at 80° C. for 30 minutes to form the polyurethane elastomeric composition molds. The composition molds are ⅛ inches thick, approximately 11 inches wide and approximately 11 inches long.

are heated continuously in ovens at both 90° C. and 102° C. The Examples are removed at predetermined times and are tested for tensile strength and elongation as described above. Each measurement is performed in triplicate. This method may be known as "hot wet aging". FIG. 1 shows the change in tensile strength of Examples 1-3 and Comparative Example 1 at 90° C. over a period of 168 days of hot wet aging. FIG. 2 shows the change in tensile strength of Examples 1-3 and Comparative Example 1 at 102° C. over a period of 168 days of hot wet aging. FIG. 3 shows the change in tensile strength of Examples 4-6 and Comparative Example 2 at 90° C. over a period of 168 days of hot wet aging. FIG. 4 shows the change in tensile strength of Examples 4-6 and Comparative Example 2 at 102° C. over a period of 168 days of hot wet aging.

Referring to FIGS. 1 and 2, Example 1 is the most hydrolytically stable (i.e., most resistant to hydrolysis). As shown in FIG. 1, after 168 days of hot wet aging at 90° C., Example 1 drops 3.8% of its initial tensile strength of 2158

TABLE 1

|  | Ex. 1 | Ex. 2 | Ex. 3 | Comp. Ex. 2 | Ex. 4 | Ex. 5 | Ex. 6 | Comp. Ex. 1 |
|---|---|---|---|---|---|---|---|---|
| Isocyanate Component (parts per 100 units of reactive component) | | | | | | | | |
| Isocyanate | 55.98 | 50.17 | 48.05 | 55.98 | 55.98 | 55.98 | 55.98 | 46.93 |
| Isocyanate-Reactive Component (parts by weight) | | | | | | | | |
| Polydiene Polyol | 80.48 | 28.74 | 9.88 | 100.00 | 92.00 | 87.50 | 83.00 | — |
| Supplemental Polyol | — | 51.74 | 70.60 | — | — | — | — | 80.48 |
| Chain Extender | 17.00 | 17.00 | 17.00 | 0.00 | 8.00 | 12.50 | 17.00 | 17.00 |
| Fomrez UL-28 Additve | 0.02 | 0.02 | 0.02 | — | — | — | — | 0.02 |
| Antifoam A Additive | 0.50 | 0.50 | 0.50 | — | — | — | — | 0.50 |
| Molecular Sieve 3A | 2.00 | 2.00 | 2.00 | — | — | — | — | 2.00 |
| Physical Properties | | | | | | | | |
| Index | 105 | 105 | 105 | Not Measrd | Not Measrd | Not Measrd | Not Measrd | 105 |
| Tensile (psi) | 2158 | 1787 | 949 | 366 | 1141 | 1686 | 2188 | 655 |
| Tensile (MPa) | 14.9 | 12.3 | 6.5 | 2.5 | 7.9 | 11.6 | 15.1 | 4.5 |
| Elongation (%) | 59 | 90 | 78 | 62 | 73 | 122 | 120 | 87 |

Isocyanate Component comprises polymeric diphenylmethane diisocyanate and 4,4'-diphenylmethane diisocyanate, and has an NCO content of about 33.5 weight percent.

Polydiene Polyol is a hydroxyl-terminated polybutadiene having about 20 percent by weight 1,2-vinyl units, a molecular weight of about 1200 g/mol, and a viscosity at 30° C. of about 1.4 Pa·sec.

Supplemental Polyol is a polyether polyol having a nominal hydroxy functionality of 2, a hydroxyl number of 56 mg KOH/g, and a molecular weight of 2000 g/mol.

Chain Extender is dipropylene glycol.

Examples 1-6 as well as Comparative Examples 1 and 2 are tested for physical properties of tensile strength and elongation. Results are shown in Table 1 above. The tensile strength and elongation were measured by the DIN 53504 S2 standard method.

In order to test the hydrolytic stability (hydrolysis resistance) of the Examples 1-6 and Comparative Examples 1 and 2, the examples are submerged in ASTM seawater and psi. As shown in FIG. 2, after 168 days of hot wet aging at 102° C., Example 1 drops 29.8% of its initial tensile strength of 2158 psi.

Also, referring to FIGS. 1 and 2, Comparative Example 1 is the least hydrolytically stable (i.e., least resistant to hydrolysis). As shown in FIG. 1, after 168 days of hot wet aging at 90° C., Comparative Example 1 drops 68.4% of its initial tensile strength of 655 psi. As shown in FIG. 2, Comparative Example 1 decomposes after 80 days of hot wet aging at 102° C.

Also, referring to FIGS. 1 and 2, Examples 2 and 3 exhibit excellent hydrolytic stability. At 90° C., Example 2 is more hydrolytically stable than Example 3. At 102° C., Example 2 is more hydrolytically stable than Example 3. It is believed that this result is due to the amount of Polydiene Polyol in Example 2 as compared to the amount of Polydiene Polyol in Example 3.

Referring to FIGS. 3 and 4, Example 4 is more hydrolytically stable than Comparative Example 2. For example, Example 4 drops 25.0% of its initial tensile strength after 168 days of hot wet aging at 102° C. compared to Comparative Example 2, which drops 30.0% of its initial tensile strength after 168 days of hot wet aging at 102° C. This results in a 1.7 MPa tensile strength for Comparative Example 2 and a much higher tensile strength of 5.9 Mpa for Example 4. Also, Examples 5 and 6 exhibit tensile strength reflecting hydrolytic stability. After 168 days of hot wet aging at 102° C., Example 5 drops 40.1% of its initial tensile strength for an ending tensile strength of 6.9 MPa. After 168 days of hot wet aging at 102° C., Example 6 drops 42.4% of its initial tensile strength for an ending tensile strength of 8.7 MPa. After 168 days of hot wet aging at 90° C., Example 5 drops 19.5% of its initial tensile strength for an ending tensile strength of 9.3 MPa. After 168 days of hot wet aging at 90° C., Example 6 drops 13.3% of its initial tensile strength for an ending tensile strength of 13.1 MPa. Thus, Examples 4-5 exhibit an ending tensile strength, which is hydrolytically stable, much higher than the ending tensile strength of Comparative Example 2.

The results of the methods described above indicate that Examples 1-6 demonstrate excellent hydrolytic and thermal stability. That is, the hydrolytic and thermal stability of the polyurethane elastomeric compositions of Examples 1-6 is superior to that of a polyurethane elastomeric composition which is not formed from a polydiene polyol.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is to be understood that the term average hydroxy functionality is used when referring to a mixture of polymers, such as a mixture of a polyether polyol and a polydiene polyol.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A flexible polyurethane elastomeric composition for coating a substrate, said composition comprising the reaction product consisting of:
   (A) an isocyanate component comprising diphenylmethane diisocyanate (MDI) and/or polymeric MDI in an amount of 48.05 to 55.98 parts by weight based on 100 parts by weight of an isocyanate-reactive component; and
   (B) the isocyanate-reactive component consisting of
      a polydiene polyol present in the isocyanate-reactive component in an amount of 9.88 to 92.00 parts by weight based on 100 parts by weight of said isocyanate-reactive component and having an average hydroxy functionality of no greater than about 3 and a number average molecular weight of from about 1000 to less than about 2000 g/mol, wherein the polydiene polyol comprises about 20 percent by weight 1,2-vinyl units based on the total weight of the polydiene polyol and has a viscosity of about 0.9 to 1.9 Pa·s;
      a chain extender present in the isocyanate-reactive component in an amount of 8.00 to 17.00 parts by weight based on 100 parts by weight of said isocyanate-reactive component and having at least two hydroxyl groups and a molecular weight of from about 62 to about 220; and
      optionally, a polyether polyol, a catalyst, an antifoaming agent, and a molecular sieve.

2. The polyurethane elastomeric composition of claim 1, wherein the polydiene polyol is a polybutadiene polyol.

3. The polyurethane elastomeric composition of claim 1, wherein the polyether polyol and the polydiene polyol together have an average hydroxy functionality of no greater than about 3.

4. The polyurethane elastomeric composition of claim 3, wherein the polyether polyol has a nominal hydroxyl functionality of from about 2 to about 4, a hydroxyl number of from about 20 to about 1000 mg KOH/g, and a number average molecular weight of from about 400 to about 15,000 g/mol.

5. The polyurethane elastomeric composition of claim 1, wherein the average hydroxy functionality is no greater than about 2.

6. The polyurethane elastomeric composition of claim 1, wherein the chain extender comprises an alkylene glycol.

7. The polyurethane elastomeric composition of claim 1, wherein polydiene polyol present in the isocyanate-reactive component in an amount of from 60 to 90 parts by weight based on 100 parts by weight of the isocyanate-reactive component.

8. A subsea structure at least partially coated with the polyurethane elastomeric composition of claim 1.

9. The subsea structure of claim 8, wherein the subsea structure is a pipe, a flowline, a manifold, a riser, a field joint, a bend restrictor, a bend stiffener, a joint, a jumper, a pipeline end terminator, a pipeline end manifold, or a Christmas tree.

10. A method comprising:
    applying the polyurethane elastomeric composition of claim 1, to a subsea structure.

11. The method of claim 10, wherein applying the polyurethane elastomeric composition comprises simultaneously spraying the isocyanate component and the isocyanate-reactive component onto the subsea structure.

12. The method of claim 10, further comprising immersing the subsea structure into a fluid, wherein the subsea structure is insulated from the fluid by the polyurethane elastomeric composition.

13. A method of forming the flexible polyurethane elastomeric composition according to claim 1 on a substrate, said method comprising:

(A) providing said substrate;
(B) providing said isocyanate component;
(C) providing said isocyanate-reactive component;
(D) reacting the isocyanate component and the isocyanate-reactive component together to form a reaction mixture; and
(E) applying said reaction mixture to said substrate and forming the polyurethane elastomeric composition on said substrate.

14. The method of claim 13, wherein reacting the isocyanate component and the isocyanate-reactive component together comprises heating the isocyanate component and the isocyanate-reactive component.

15. The method of claim 13, wherein the polydiene polyol is a polybutadiene polyol.

16. The method of claim 13, wherein the polyether polyol and the polydiene polyol together have an average hydroxy functionality of no greater than about 3.

17. The method of claim 16, wherein the polyether polyol has a nominal hydroxy functionality of from about 2 to about 4, a hydroxyl number of from about 20 to about 1000 mg KOH/g, and a number average molecular weight of from about 400 to about 15,000 g/mol.

18. The method of claim 13, wherein the average hydroxy functionality is no greater than about 2.

* * * * *